USO05571482A

United States Patent [19]
Long et al.

[11] Patent Number: 5,571,482
[45] Date of Patent: Nov. 5, 1996

[54] APPARATUS FOR CONTROLLING CATALYST TEMPERATURE DURING REGENERATION

[75] Inventors: Steve L. Long, Katy; Joseph L. Ross, Dallas; Gautham Krishnaiah, Katy, all of Tex.

[73] Assignee: Stone & Webster Engineering Corporation, Boston, Mass.

[21] Appl. No.: 874,590

[22] Filed: Apr. 27, 1992

[51] Int. Cl.⁶ .............................. B01J 38/32; F27B 15/08
[52] U.S. Cl. ...................... 422/144; 208/113; 208/157; 208/164; 422/145; 422/146; 422/147; 502/44
[58] Field of Search ................... 422/143–147; 208/113, 157, 164; 502/44, 43

[56] References Cited

U.S. PATENT DOCUMENTS

| | | | |
|---|---|---|---|
| 2,436,927 | 3/1948 | Kassel | 422/144 X |
| 2,515,156 | 7/1950 | Jahnig et al. | 422/146 X |
| 2,735,802 | 2/1956 | Jahnig . | |
| 2,970,117 | 1/1961 | Harper | 208/164 |
| 3,672,069 | 6/1972 | Reh et al. | 34/20 |
| 3,990,992 | 11/1976 | McKinney | 252/417 |
| 4,009,121 | 2/1977 | Luckenbach | 252/417 |
| 4,064,039 | 12/1977 | Penick | 208/160 |
| 4,219,442 | 8/1980 | Vickers | 422/144 X |
| 4,220,622 | 9/1980 | Kelley | 422/109 |
| 4,284,494 | 8/1981 | Bartholic et al. | 208/164 |
| 4,325,817 | 4/1982 | Bartholic et al. | 208/164 |
| 4,343,634 | 8/1982 | Davis | 62/62 |
| 4,353,812 | 10/1982 | Lomas et al. | 422/144 X |
| 4,388,218 | 6/1983 | Rowe | 252/417 |
| 4,434,245 | 2/1984 | Lomas et al. | 502/2 |
| 4,439,533 | 3/1984 | Lomas et al. | 502/6 |
| 4,483,276 | 11/1984 | Lomas et al. | 122/4 D |
| 4,615,992 | 10/1986 | Murphy | 502/41 |
| 4,664,778 | 5/1987 | Reinkemeyer | 208/113 |
| 4,820,404 | 4/1989 | Owen | 208/159 |
| 4,840,928 | 6/1989 | Harandi et al. | 502/41 |
| 4,904,372 | 2/1990 | Goelzer | 208/113 |
| 4,965,232 | 10/1990 | Mauleon et al. | 502/43 |
| 4,989,669 | 2/1991 | Barnes | 165/104.16 |
| 5,002,915 | 3/1991 | Harandi et al. | 502/41 |
| 5,009,769 | 4/1991 | Goelzer | 208/113 |
| 5,027,893 | 7/1991 | Cetinkaya et al. | 165/104.8 |

OTHER PUBLICATIONS

Lai zhou ping, "Catalyst Cooler for Residue Catalytic Cracking", Interpec China '91, vol. 3 (Sep. 11–15, 1991).

*Primary Examiner*—Robert J. Warden
*Assistant Examiner*—Theresa T. Snider
*Attorney, Agent, or Firm*—Hedman, Gibson & Costigan, P.C.

[57] ABSTRACT

A catalyst cooler apparatus and process for use with a two-stage regeneration system in a fluidized catalytic cracking process having a device to remove hot catalyst from the second regeneration zone at a point above the air distribution ring under the surface of the catalyst bed equivalent to the catalyst exit to the reactor, a heat exchanger for indirect heat exchange and cooling of the catalyst and a return device for returning the cooled catalyst to the second regeneration zone at or near the bottom of the catalyst bed, beneath the air distribution ring.

1 Claim, 3 Drawing Sheets

APPARATUS FOR CONTROLLING CATALYST TEMPERATURE DURING REGENERATION

FIELD OF THE INVENTION

The present invention relates to regeneration of catalyst for continuous use in a fluidized catalytic cracking environment and more specifically to temperature control of the regenerated catalyst.

BACKGROUND OF THE INVENTION

Fluidized catalytic cracking (FCC) processes are widely used for the conversion of hydrocarbon feed streams such as vacuum gas oils and other relatively heavy oils into lighter and more valuable hydrocarbon products. The FCC process utilizes a finely divided particulate catalyst fluidized by a gas or vapor for contact with the starting hydrocarbon feed stream, also in a fluidized form. As the particulate catalyst proceeds in the reaction its catalytic sites are covered by coke, a by-product of the reaction, deposited on the surface of the catalyst particles which inhibits the catalytic activity. A catalyst regenerator is used to burn the coke off of the catalyst for regeneration and reuse of the catalyst in the cracking process.

Burning of the coke from the spent catalyst generates large amounts of heat which is utilized at least in part to supply the heat necessary for the endothermic cracking reaction taking place in the reactor. As the hydrocarbon feeds become heavier, i.e. have higher Conradson Carbon values, however, the amount of coke by-product developed on the catalyst in the catalytic reaction increases. Therefore, the use of heavier feeds can lead to excess heat generated during catalyst regeneration due to the burning of larger amounts of coke developed on the catalyst.

The additional heat can create a number of problems in the FCC process, including upsetting the heat balance, requiring limitation of hot catalyst fed to the reaction resulting in lower yields, and damaging the equipment or catalyst. Therefore, it is beneficial to have a means to lower the catalyst temperature during regeneration if the heat balance is exceeded.

Various methods of removing heat during regeneration have been tried, however, heat exchange through indirect contact with a cooling medium has been most widely adopted. Generally, indirect contact heat exchange is achieved using cooling coils or tubes, through which a cooling fluid is passed. The cooling coils can run through a bed of the catalyst particles internal to the regenerator or through a separate catalyst bed external to the regenerator.

Heat exchangers utilizing cooling coils or tubes running through a fluidized catalyst particle bed internal to the regenerator are illustratively shown in U.S. Pat. Nos. 4,009,121 to Luckenbach, 4,220,622 to Kelley, 4,388,218 to Rowe and 4,343,634 to Davis. Internal heat exchangers, however, are difficult to retrofit and/or service.

External heat exchangers are generally flow-through coolers where catalyst is withdrawn from the regenerator and directed into a separate vessel having cooling tubes or coils therein. There are basically two types of external coolers, flow-through and back-mix coolers. Generally, flow-through coolers are either gravity feed, where catalyst enters one upper inlet and exits a lower outlet, or fluidized transport which moves catalyst from a lower inlet past the cooling coils to an upper outlet. Back-mix coolers utilize a common catalyst inlet and outlet to move the catalyst from the hot catalyst source to the heat exchanger and back.

Back-mix heat exchangers are shown in U.S. Pat. Nos. 3,672,069 to Reh et al and 4,439,533 and 4,483,276 both to Lomas et al. U.S. Pat. No. 5,027,893 to Cetinkaya et al relates to a heat exchanger with a combination of back-mix and flow-through characteristics, the inlet being at the top of the exchanger, the outlet in the middle with cooling coils and catalyst throughout the exchanger.

Also, several references disclose a hot catalyst inlet at the mid-portion of the heat exchanger and an outlet at the bottom of the heat exchanger where a fluidizing gas moves the cooled catalyst back up to the regenerator vessel. These illustratively include U.S. Pat. Nos. 2,735,802 to Jahnig and 4,615,992 to Murphy.

Other flow-through heat exchangers, are placed between the hot catalyst source (regenerator) and the reaction zone to regulate the temperature of the catalyst entering the reaction. Examples of such a system are found in U.S. Pat. Nos. 4,284,494 and 4,325,817 to Bartholic et al.

A regenerator apparatus using pure gravity feed flow-through heat exchanger is shown in U.S. Pat. No. 2,970,117 to Harper. The Harper heat exchanger removes catalyst from the catalyst bed of a single stage regeneration vessel and returns the cooled catalyst at a lower portion of the catalyst bed.

A regenerator apparatus using fluidized transport to move catalyst from the bottom of a single stage regenerator upward over the cooling coils and back to the top of the regenerator is described in U.S. Pat. No. 4,064,039 to Penick.

A two-stage regeneration system with catalyst cooling is described in U.S. Pat. No. 4,965,232 to Mauleon et al where regenerated catalyst is removed from the second stage and sent to a holding vessel where it is then sent to an external heat exchanger and cooled catalyst is returned to the first stage of the regeneration zone.

Regulation of the amount of cooling in the heat exchangers is achieved in various ways. For instance, U.S. Pat. Nos. 4,434,245, 4,353,812 and 4,439,533 disclose hydrocarbon conversion processes wherein the catalyst is removed from a regenerator and cooled in side or external heat exchange coolers and then returned to the regenerator. The method described for controlling heat removal in the regenerator involves the extent of immersion of the cooling coils in the dense phase regenerated catalyst bed or controlling the rate of flow of regenerated catalyst through the external coolers.

U.S. Pat. No. 2,436,927 discloses a fluidized catalytic conversion process wherein the crude feed is contacted with a silica-alumina type catalyst for producing high quality gasoline. Heat removal is achieved through the use of an external cooler and control is achieved by regulating the amount of catalyst passing through that cooler.

U.S. Pat. Nos. 3,990,992 and 4,219,442 illustrate regenerator units having heat removal means different from those described above. These regenerator units are divided into two portions, the regenerator having a lower portion for effecting combustion of the catalyst and an upper section wherein residual combustion is effected along with heat removal. Heat removal is achieved through internal coils in the upper section of the regenerator. Temperature control is achieved by controlling the amount of regenerated catalyst removed to the upper zone and then reintroduced along with coke contaminated catalyst to the combustion zone. The balance of the regenerated catalyst is reintroduced to the catalytic reactor.

SUMMARY OF THE INVENTION

It is therefore an object of the present invention to provide an improved catalyst regeneration system and process including a catalyst cooler for use with a two stage regeneration system. It is a further object to provide such an improved system which is simple to construct in a new plant or to retrofit into an existing regenerator.

These and other objects are achieved in a fluidized catalytic cracking system including a cracking reactor and a two-stage catalyst regeneration system, the first stage of said regeneration system comprising a first regeneration vessel having a catalyst bed, means to deliver spent catalyst from the cracking reactor to the first regeneration vessel, means to charge an oxidizing gas to the first regeneration vessel where oxidation of the spent catalyst takes place, means to deliver the catalyst from the first regeneration vessel to the second stage, said second stage comprising a second regeneration vessel having a catalyst bed therein where the catalyst from the first stage is delivered, means to charge an oxidizing gas to the second regeneration vessel to complete regeneration of the catalyst, and means to deliver the regenerated catalyst from the second regeneration vessel to the reactor including exit means from the second regenerator vessel below the surface of the catalyst bed, wherein the improvement comprises a catalyst cooling system associated with the second regeneration vessel comprising a heat exchanger, means for delivery of said catalyst to the heat exchanger including outlet means to the heat exchanger located on the second regeneration vessel at a point above the delivery of the oxidizing gas and below the surface of the catalyst bed at a level approximately equal to the level of the exit means from which the regenerated catalyst is taken for delivery to the reactor, means for return of cooled catalyst from the heat exchanger to the second regeneration vessel including cooled catalyst inlet means to the second regeneration vessel at a point below the delivery of oxidizing gas, said heat exchanger comprising indirect cooling means within a heat exchange vessel for indirect heat exchange between the catalyst and a cooling medium flowing through the indirect cooling means.

Similarly, the objects are achieved by a process for fluidized catalytic cracking including a cracking reactor and a two-stage catalyst regeneration system, the two-stage regeneration system comprising a first regeneration vessel having a catalyst bed therein, including means for delivering spent catalyst from the catalytic reactor, means for charging an oxidizing gas to said first regeneration vessel thereby oxidizing the spent catalyst to achieve approximately 60% regeneration and a second regeneration vessel having a catalyst bed therein, and further comprising means for delivering the partially regenerated catalyst from said first regeneration vessel to said second regeneration vessel, further comprising means for charging oxidizing gas to said second regeneration vessel for completing regeneration of the catalyst and delivery means for delivering the regenerated catalyst to the reactor including exit means from the second regenerator vessel at a point below the surface of the catalyst bed, the improvement comprising removing the catalyst from the second regeneration vessel at a point approximately equal to the exit means associated with delivering the regenerated catalyst to the reactor, passing the catalyst from the second regeneration vessel through conduit means to a heat exchanger by gravity, fluidizing the catalyst passed to the heat exchanger in the heat exchanger, cooling the catalyst in the heat exchanger by contact with indirect cooling means having a cooling medium flowing therethrough, removing the cooled catalyst from the heat exchanger by gravity to return conduit means, passing the cooled catalyst to the second regeneration vessel via riser means, introducing the cooled catalyst to the second regeneration vessel at a point below the means for charging oxidating gas to the second regeneration vessel and regulating the amount of cooling by monitoring the temperature of the catalyst.

DESCRIPTION OF THE PREFERRED EMBODIMENT

Figure 1:
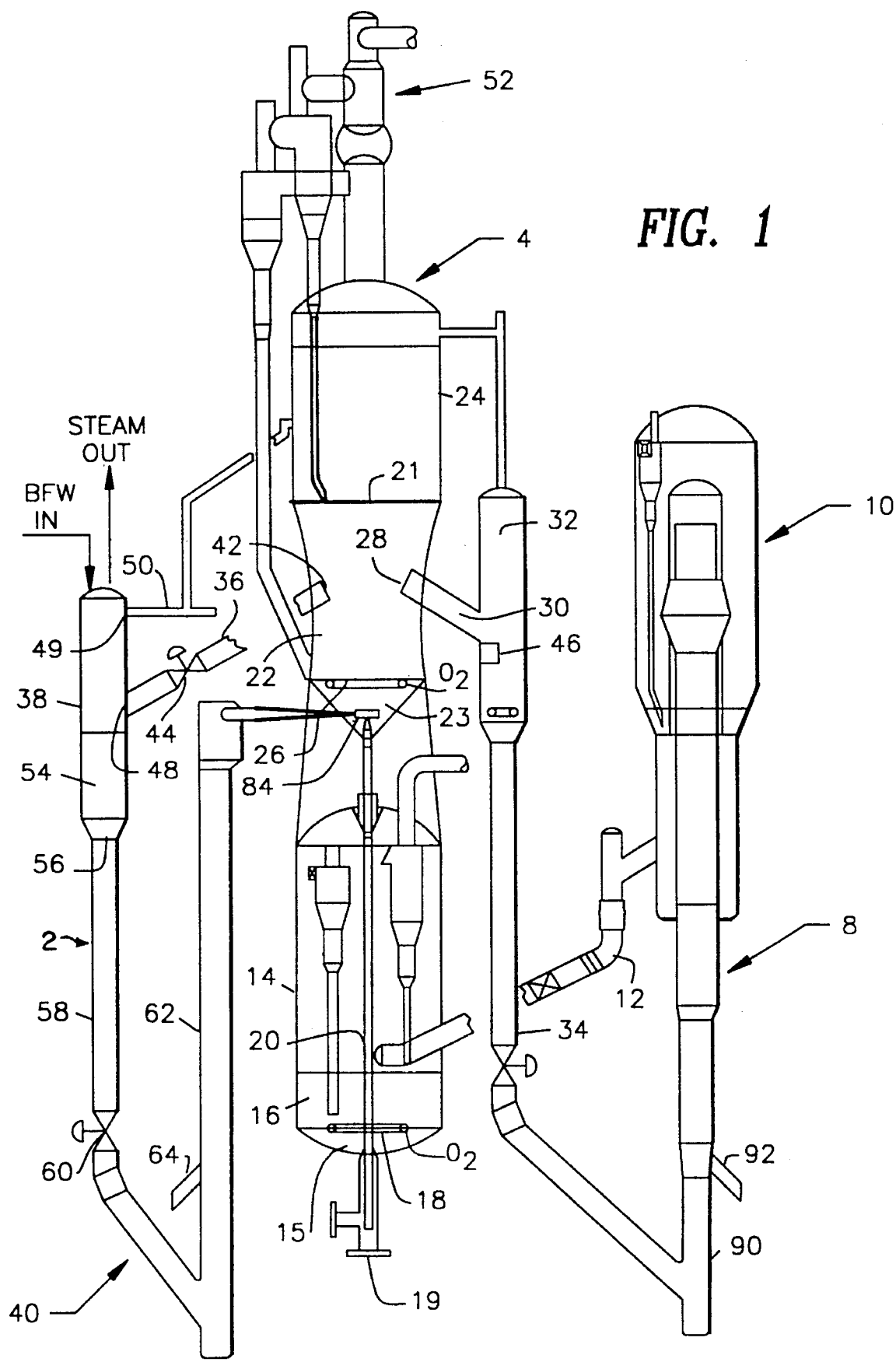
FIG. 1 is a schematic plan view of a reactor/catalyst regeneration system for the fluidized catalytic cracking of hydrocarbons incorporating the catalyst cooling apparatus of the present invention.

As shown in FIG. 1, the catalyst cooler 2 of the present invention cooperates with a two-stage catalyst regeneration system 4 including means 6 to deliver regenerated catalyst to the reactor 8. The reactor 8 also includes separation/stripping zone 10 for separating and stripping the spent catalyst from the product gases and delivery means 12 for passing the spent catalyst to the regeneration system 4.

The delivery means 12 which passes the spent catalyst to the regeneration system 4 is in flow communication with the first regeneration zone vessel 14. The spent catalyst delivered to the first regeneration vessel 14 by delivery means 12 forms a fluid catalyst bed 16. An oxidizing gas, such as air or oxygen, is charged to the first regeneration vessel 14 by delivery means such as a gas distributor, herein shown as a gas distribution ring 18. In the first regeneration vessel 14 a quantity of the coke deposited on the catalyst during the catalytic reaction is burned off at temperatures of from about 1050° F. to about 1300° F.

Usually, the quantity of coke combusted in the first regeneration vessel 14 is varied to achieve a desired temperature in the second regeneration vessel 24, within the above range, set by the minimum rate of coke combustion and maximum rate of catalyst hydrothermal deactivation that is acceptable for the unit. Locating the cooler 2 on the second regeneration vessel 24 enables the removal of heat from the second vessel 24.

The ability to remove heat from the second regeneration vessel 24 benefits the system in various ways. One benefit is seen by allowing the first regeneration vessel 14 to be operated at a fixed carbon combustion rate resulting in a constant flue gas rate and a narrow operating temperature range. A fixed flue gas rate enables a flue gas power expander (not shown) to operate at or near the design point of maximum efficiency of the expander. In addition, fluctuations in the steam generation of the carbon monoxide boiler (not shown) will be minimized. Any variation in coke production in the reaction due to either a change in feed quality or processing mode etc., will be accommodated by the change in combustion rates in the second regeneration vessel 24. Heat will be recovered from the second regeneration zone flue gas stream by a waste heat boiler (not shown) which will be designed to accommodate these fluctuations in flue gas rates.

This exemplary configuration of flue gas expander and CO boiler on the first regeneration vessel 14 and waste heat boiler on the second regeneration vessel 24 will minimize the capital investment of the flue gas system and consequently the cost of the unit. In any event, however, the catalyst cooling benefits the system by preventing excess burning as well as allowing recovery of heat from the flue gas.

The partially regenerated catalyst, with approximately 60% of the coke burned off and, therefore, substantially free of organic hydrogen in residual carbon deposits thereon, is withdrawn from a lower portion 15 of the catalyst bed 16 in the first regeneration vessel 14 for transfer upwardly through riser 20 for delivery to discharge into the lower portion 23 of the catalyst bed 22 in the second regeneration vessel 24. A lift gas such as compressed air is charged to the bottom inlet 19 of riser 20, regulated by a valve (not shown) for flow control.

Additional oxidating gas, such as air or oxygen, is charged to the catalyst bed 22 in the second regeneration vessel 24 by delivery means such as a gas distributor, shown as a gas distribution ring 26, to burn off the remaining coke on the catalyst for complete regeneration. The temperature of the catalyst in the second regeneration vessel 24 ranges generally from about 1200° F. to about 1600° F. The regenerated catalyst is then passed out of exit means such as outlet 28 along a conduit 30 into a withdrawal well 32 for delivery to the reactor 8 along a downstream conduit 34.

The system described above is described in a very general manner to set the environment in which the present invention functions. A more detailed description of suitable two-stage catalyst regeneration systems can be found, inter alia, in U.S. Pat. Nos. 4,904,372 and 5,009,769.

Turning now to the improvement which comprises the present invention, the temperature of the catalyst in the second regeneration vessel 24 is reduced through indirect cooling utilizing a catalyst cooler 2. The catalyst cooler 2 is generally comprised of a conduit 36 for delivery of the catalyst from the second regeneration vessel 24 to the heat exchange vessel 38 and conduit means 40 for return of the cooled catalyst to the second regeneration vessel 24.

The catalyst leaves the second regeneration vessel 24 and enters conduit means 36 through outlet 42. The outlet 42, directed to conduit 36 and the heat exchanger 38, is approximately at an equal height on the second regeneration vessel 24 as exit means 28 which provides regenerated catalyst to the reactor 8. The outlet 42 to the heat exchange vessel 38, like the exit means 28 to the reactor 8, is at a point above the regeneration gas distribution ring 26 but below the surface 21 of the catalyst bed 22.

Conduit 36, having a slide valve 44 therealong, delivers hot catalyst from the second regeneration vessel to the middle of the heat exchanger 38 through inlet 48. Inlet 48 is preferably placed in the middle of the heat exchanger 38 to allow for venting of the flue gas above the catalyst being cooled through outlet 49 into vent line 50. Vent line 50 is in flow communication with the second regeneration zone 24, venting at any height above catalyst outlet 42, allowing for further separation of catalyst fines through separation means 52 and return to the catalyst bed 22 as known in the art.

Figure 2:
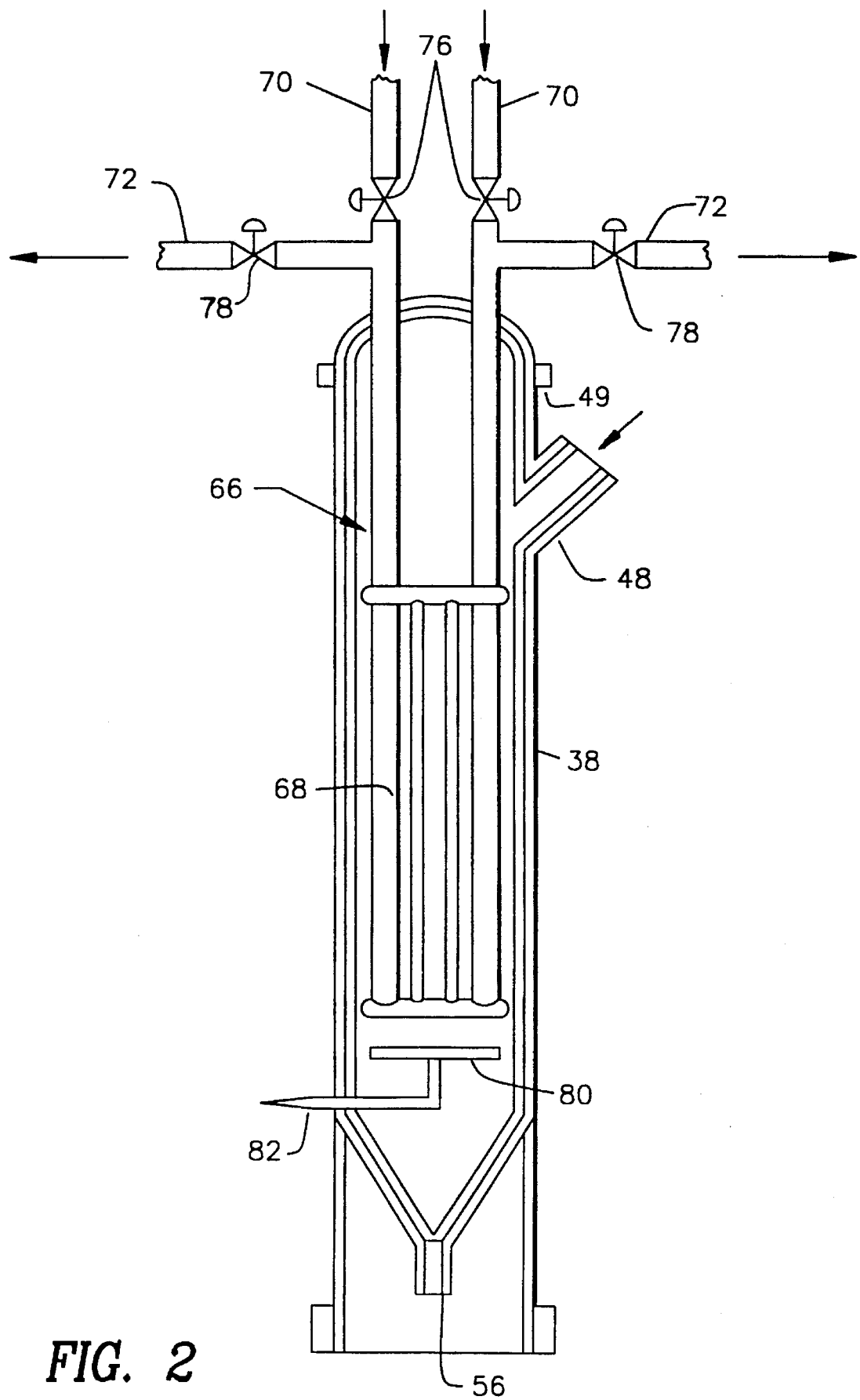
FIG. 2 is a cross-sectional schematic elevational view of the heat exchanger contemplated for use in the present invention.

The heat exchanger 38 (shown in FIG. 2 and more fully described in Lai zhou ping, "*Catalyst Cooler for Residue Catalytic Cracking*", Interpec China '91, Vol. 3 (Sep. 11–15, 1991)) is comprised of a vessel 38 containing a series of cooling coils or tube bundles 66. The bundles 66 comprise heat exchange tubes 68 with a boiler feed water supply tube 70 and a vapor discharge tube 72, the discharge tube 72 being utilized for removal of hot water and steam after heat exchange. The length of the heat exchange tubes 68 are generally about one-half the length of the interior of the heat exchanger 38, terminating at the top in the water supply tube 70 encased by the discharge tube 72. Outside the heat exchange vessel 38 the supply tube 70 and discharge tube 72 diverge, each having a valve, 76 and 78 respectively, for individual control of the bundles 66. In the preferred embodiment at least 5, and typically 10–20 or more, heat exchange tubes 68 are used in the vessel 38.

The hot catalyst entering the heat exchange vessel 38 through inlet 48 forms a catalyst bed 54 in the heat exchanger 38. The cooling bundles 66 extend into and above the catalyst bed 54 for indirect heat exchange. A fluidizing gas distributor, such as a gas distribution ring 80, in flow communication with a fluidizing gas conduit 82, is located at the lower portion of the heat exchange vessel 38, below the bundles 66. The distribution ring 80 discharges air or other fluidizing gas, such as flue gas from the first regeneration vessel 14, to maintain the fluidized state of the catalyst bed in the heat exchanger 38, enhance circulation and promote heat exchange. Additional features may be combined with the heat exchange vessel 38, such as manways, pressure connections, etc., if desired.

The cooled catalyst exits the heat exchange vessel 38 by gravity through lower outlet 56 into downflow conduit 58 having a slide valve 60 therein to restrict catalyst flow. The cooled catalyst is returned to the second regeneration vessel 24 by means of a dilute phase lift riser 62. The lift media is either flue gas from the first regeneration vessel 14 or combustion air from an air blower (not shown), combustion air being preferred, injected by lift air nozzle 64.

Cooled catalyst from the lift riser 62 is introduced back to the second regeneration vessel 24 at or near the point that catalyst is introduced from the riser 20, below the gas distribution ring 26 in catalyst bed 22.

The discharge of catalyst from the lift riser 62 and the riser 20 are preferably accommodated by a common catalyst and gas distributor, such as a mushroom cap distributor 84 or other such device as known in the art, at or near the bottom of the catalyst bed 22. The mushroom cap distributor 84 has orifices in the cap and weir fashion notches at the rim of the cap to insure good distribution of the catalyst and lift media in the dense fluidized bed 22. The lift media requirement of the lift riser 62 can vary from 0% to about 20% of the total combustion air required for complete combustion of coke in the second regeneration vessel 24. Typical lift media requirements for catalyst transfer from the first regeneration vessel 14 to the second regeneration vessel 24 along riser 20 ranges from about 20% to about 40% of the total combustion air requirement of the second regeneration vessel 24.

Efficient regeneration of spent catalyst is achieved by proper distribution of spent catalyst and air, good contact between catalyst and air and adequate residence time for complete combustion of coke in the dense phase fluidized bed 22. Discharging the mixture of catalyst and lift media beneath the air distributor ring 26 or, equivalently, at the lowest point in the second regeneration vessel 24 ensures that the catalyst and lift air will be dispersed effectively in the second regeneration vessel catalyst bed 22.

An additional result of this discharge location is that adequate residence time is provided for complete combustion of coke in the dense phase fluidized bed 22. Since the total lift media requirements add up to 20% to 60% of the combustion air required for the second regeneration vessel 24, it is important to locate the discharge at the lowest point in the vessel 24 and ensure proper mixing of the air with the second regeneration vessel catalyst inventory.

Another advantage of discharging the catalyst at this location will be the assurance that the discharged catalyst will not bypass and enter the cooler 38 or holding vessel 32 and thereby negatively affect the cooling or reaction systems.

Downflow conduit 58 has valve means such as a slide valve 60 therein to regulate the flow of catalyst through the heat exchanger 38. Catalyst circulation rate through the cooler 38 is regulated by the lower slide valve 60 with a view to maintain second regeneration zone control temperature, such as the dense phase fluidized bed temperature, at a constant value, preferably in the range of 1200° to 1600° F. Temperature measurements for control purposes can be obtained from the dense phase fluidized bed 22, withdrawal well 32, regenerated catalyst conduits 30 or 34 or the initial reactor riser 90 prior to introduction of feed at nozzle 92. The preferred location for this temperature measurement is the dense phase fluidized bed 22 of the second regeneration zone 24.

Monitoring the temperature in the catalyst bed 22 is preferably performed with a thermocouple 46 (shown in withdrawal well 32 in FIG. 1). An increase in the controlled temperature causes the slide valve 60 to open further resulting in an increase in the catalyst circulation rate through the heat exchanger 38, resulting in increased heat removal. An increased amount of cooled catalyst is returned to the second regeneration zone dense phase bed 22 which results in lowering the controlled temperature. A decrease in the controlled temperature results in the opposite sequence, i.e. closing of the slide valve 60 and decreasing circulation of catalyst through the heat exchanger 38.

The catalyst circulated, and hence the heat removal capability of the heat exchanger 38, can be varied from 0% to 100%. However, the catalyst circulated through the heat exchanger 38 preferably ranges from 0% to about 70% of the catalyst transferred between the first 14 and second 24 regeneration vessels.

Figure 3:
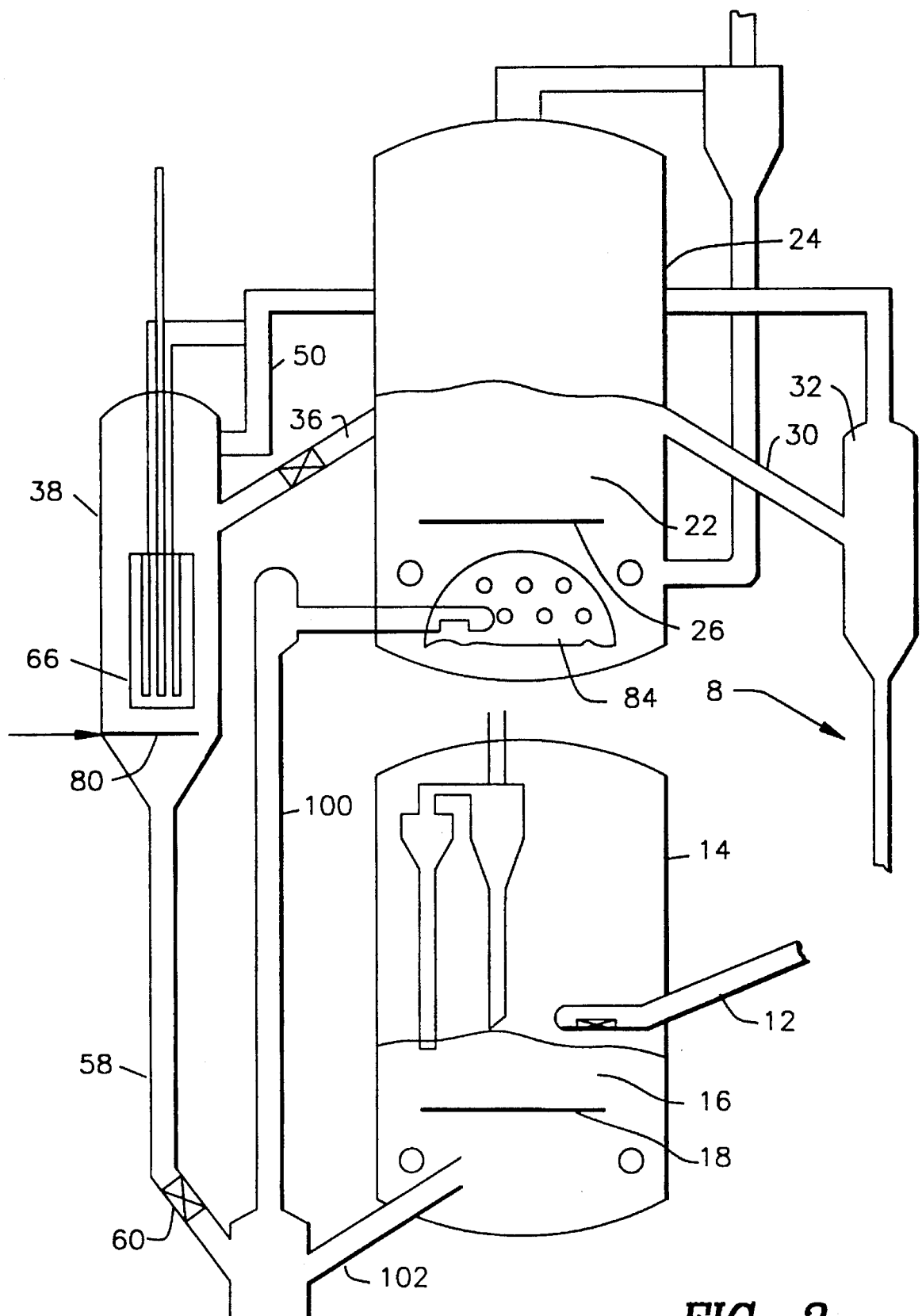
FIG. 3 is a schematic plan view of another embodiment of the present invention.

In an alternate version, shown in FIG. 3, a single, common, lift riser 100 accommodates cooled catalyst returning from the heat exchanger 38 as well as partially regenerated catalyst transferred from the first 14 to the second 24 regeneration vessels. In this version, catalyst is withdrawn at or below the air distributor 18 of the first regeneration vessel 14 along conduit 102, connected to riser 100. The lift media in this instance can be either flue gas from the first regeneration vessel 14 or blower combustion air, combustion air being preferred.

Variations of the foregoing as obvious to those skilled in the art are intended to be included in the present invention, limited only by the appended claims. All cited patents and publications are hereby incorporated by reference.

We claim:

1. In a fluidized catalytic cracking system including a cracking reactor and a two-stage catalyst regeneration system, the first stage of said regeneration system comprising a first regeneration vessel having a catalyst bed, means to deliver catalyst from the cracking reactor to the first regeneration vessel, means to charge an oxidizing gas to the first regeneration vessel where oxidation of the spent catalyst takes place, said second stage comprising a second regeneration vessel having a catalyst bed therein where the catalyst from the first stage is delivered, means to deliver the catalyst from the first regeneration vessel to the second regeneration vessel, means to charge an oxidizing gas to the second regeneration vessel to complete regeneration of the catalyst, and means to deliver the regenerated catalyst from the second regeneration vessel to the reactor including exit means from the second regenerator vessel, wherein the improvement comprises a catalyst cooling system associated with the second regeneration vessel comprising a heat exchanger, means for delivery of catalyst from said second regeneration vessel to the heat exchanger including outlet means to the heat exchanger located on the second regeneration vessel at a point above the delivery of the oxidizing gas and at a level approximately equal to the level of the exit means from which the regenerated catalyst is taken for delivery to the reactor, means for return of cooled catalyst from the heat exchanger to the second regeneration vessel including cooled catalyst inlet means to the second regeneration vessel at a point below the means to charge an oxidizing gas, said heat exchanger comprising indirect cooling means within a heat exchange vessel for indirect heat exchange between the catalyst and a cooling medium wherein the means for return of the cooled catalyst and the means to deliver the catalyst from the first to the second regeneration vessel comprise the same riser.

* * * * *